(12) United States Patent
Burns et al.

(10) Patent No.: US 6,707,950 B1
(45) Date of Patent: Mar. 16, 2004

(54) METHOD FOR MODIFICATION OF NON-IMAGE DATA IN AN IMAGE PROCESSING CHAIN

(75) Inventors: Peter D. Burns, Fairport, NY (US); Andrew C. Gallagher, Rochester, NY (US); Alex Lopez-Estrada, Macedon, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/337,792

(22) Filed: Jun. 22, 1999

(51) Int. Cl.[7] ................................................. G06K 9/40
(52) U.S. Cl. ................. 382/254; 348/231.3; 348/231.5; 348/231.6; 382/248; 382/254; 382/272; 382/276; 358/463; 358/448; 358/452; 358/453
(58) Field of Search ................................. 382/254, 272, 382/162, 293, 275, 232, 233, 242, 248, 243, 276; 358/3.24, 448, 452–453, 1.9–3.31, 447, 461, 463; 348/231.3, 231.5, 231.6

(56) References Cited

U.S. PATENT DOCUMENTS

| 5,461,440 A | | 10/1995 | Toyoda et al. | |
|---|---|---|---|---|
| 5,528,194 A | * | 6/1996 | Ohtani et al. ................ | 382/293 |
| 5,557,429 A | * | 9/1996 | Hirose .......................... | 358/532 |
| 5,641,596 A | | 6/1997 | Gray et al. | |
| 5,694,484 A | | 12/1997 | Cottrell et al. | |
| 5,696,850 A | * | 12/1997 | Parulski et al. ............. | 382/261 |
| 5,835,627 A | * | 11/1998 | Higgins et al. ............. | 382/167 |
| 6,243,502 B1 | * | 6/2001 | Christensen et al. ........ | 382/305 |

FOREIGN PATENT DOCUMENTS

EP   0 473 414 A2   8/1991

OTHER PUBLICATIONS

Peter D. Burns and Roy S. Berns, "Error Propagation Analysis in Color Measurement and Imaging", *COLOR research and application*, vol. 22, No. 4, Aug. 1997, pp. 280–289.

Jong–Sen Lee, "Digital Image Smoothing and the Sigma Filter", *Computer Vision, Graphics, and Image Processing 24*, 1983, pp. 255–269.

Unser et al., "A Multi–Resolution Feature Reduction Technique for Image Segmentation with Multiple Components," Proceedings of the Conference on Computer Vision and Pattern Recognition, 1988, pp. 568–573.

* cited by examiner

*Primary Examiner*—Kimberly Williams
*Assistant Examiner*—Melanie Vida
(74) *Attorney, Agent, or Firm*—Thomas H. Close

(57) ABSTRACT

A method for modification of metadata in an image processing chain is disclosed. The method comprises the steps of: providing metadata corresponding to characteristics of a specific digital image; generating a metadata transformation related to at least one specific image transformation; and modifying the metadata according to the specific image transformation. The method is implemented in an image reproduction system. The system has an imaging capture device for providing digital image data. The imaging capture device can be for example a film scanner, flat bed scanner, or digital camera. A memory device stores metadata associated with the captured digital image data. The image transformations are carried out by an image processing chain. In addition to that a metadata processing chain is implemented and connected to the image processing chain in cases where the image transformations are metadata sensitive.

21 Claims, 7 Drawing Sheets

METHOD FOR MODIFICATION OF NON-IMAGE DATA IN AN IMAGE PROCESSING CHAIN

FIELD OF THE INVENTION

This invention relates to a digital imaging system wherein noise and other non-image data associated with the input devices and media is propagated through a series of imaging transforms. Particularly, this invention relates to the methods for propagating the noise and other non-image data through an image processing chain.

BACKGROUND OF THE INVENTION

Many image processing operations require non-image information in order to properly adapt their parameters to the expected conditions. Non-image information refers to data that is carried along with each image and provides information about the capture conditions, devices, expected noise statistics, etc. Non-image data will herein be also referred to as metadata. An example of this type of image processing operation is a noise reduction algorithm that uses a table of noise root-mean-square (rms) values for each color record for every signal level. The rms value of a nominally uniform image area is a measure of the pixel-to-pixel variation, and may be computed from a set of N values, as:

$$\sigma_x = \sqrt{\frac{\sum_{i=1}^{N}(x_i - \mu_x)^2}{N-1}} \qquad \text{Eq. (1)}$$

where the sample mean is $$\mu_x = \frac{\sum_{i=1}^{N} x_i}{N},$$

$x_i$ is the pixel value of the $i^{th}$-location and $\sigma_x$ is the rms pixel-to-pixel variation. Thus if the rms value is computed for uniform areas of various signal levels, the set of these values can be seen to characterize the amplitude of image noise in actual scenes acquired using the same image source, as a function of image signal.

The rms statistics could be used to adaptively discern texture from noise in localized regions of an image. Another example is image dependent sharpening where a measure of sharpness loss could be used along with rms statistics to adaptively change the level of sharpening in the image. During the processing of image information in a multistage imaging system, however, the metadata, including noise statistics, may be changed by every operation or transformation applied to the signal. If this transformation of metadata is not taken into account, then subsequent adaptive operations will not operate as intended and system performance, usually in terms of image quality, will suffer.

One way to account for the transformation of the non-image information is to estimate it directly at every step in the imaging system. For instance, U.S. Pat. No. 5,641,596 issued Jun. 24, 1997 to Gray et al., entitled "Adjusting Film Grain Properties in Digital Images", discloses a method for measuring image noise statistics based on the scanning of several uniform step patches that are not usually present in actual scenes. This estimation step could be used in imaging systems where the image processing operations are deterministic and there exists flexibility to process the set of uniform patches. However, it does not account for adaptive transformation of the noise statistics after the estimation step.

Another approach is U.S. patent application Ser. No. 08/822,722 filed Mar. 24, 1997, by Snyder et al., now allowed as of Feb. 1, 1999, which teaches how to automatically create tables consisting of noise rms values as a function of signal level from real images. Again, the method does not teach how to transform the noise statistics based on image processing operations thereafter.

Image noise propagation through several common imaging operations is addressed in the article by Peter D. Burns and Roy S. Berns, in *Color Research and Application*, entitled "Error Propagation Analysis in Color Measurement and Imaging". The analysis was not, however, applied to the transformations of noise statistics in image processing systems for use by adaptive algorithms.

Similarly, it is very useful to provide data associated with the image capture devices or capture conditions, that could be smartly used by image processing algorithms to deliver enhanced image quality. U.S. Pat. No. 5,461,440 issued Oct. 24, 1995 to Toyoda et al., entitled "Photographing Image Correction System," discloses a photographic image correction system to correct an image on the basis of degradation information inherent in a camera body or lens. The degradation information is inferred from the information of the camera and lens that is recorded in the film. This method does not teach, however, how to adjust the degradation information after subsequent image processing.

U.S. Pat. No. 5,694,484 issued Dec. 2, 1997 to Cottrell et al., entitled "System and Method for Automatically Processing Image Data to Provide Images of Optimal Perceptual Quality", teaches a method for selecting proper image transforms to a given set of metadata. However, this method does not teach the adjustment of the metadata specific to the image transform.

The prior art presented acknowledges the usefulness of noise statistics and other metadata in image processing applications. However, no prior art addresses the propagation of such data in an imaging system after its collection.

SUMMARY OF THE INVENTION

The object of the invention is to provide a method for modification of noise and other metadata along an image processing chain to improve the utility of data in subsequent operations and thereby improve the system performance and the image quality. It is necessary that the metadata be transformed after each image processing operation, so that it reflects the changes made to the image. The object is accomplished by:

a) providing metadata corresponding to characteristics of a specific digital image;

b) generating a metadata transformation related to at least one specific image transformation; and c) modifying the metadata according to the metadata transformation.

A further object of the present invention is to provide an alternative method for modification of metadata in an image processing chain to improve the output of the captured image data after processing. The metadata should be applied only on demand. The object is accomplished by a method that comprises the steps of:

a) providing metadata corresponding to characteristics of a specific digital image;

b) generating an image target whose characteristics are described by the provided metadata;

c) providing an image transformation;

d) processing the image target through the image transformation applied to the digital image; and e) calculating the modified metadata from the processed image target.

It is an object of the invention to provide an image reproduction system for modifying metadata during several steps of image processing. This improves image data output when compared to the original digital image data. The object is accomplished by a system that comprises:

a) an imaging capture device for providing digital image data;

b) memory device for storing noise and other metadata associated with the digital image data;

c) an image processing chain for carrying out image transformations; and d) a metadata processing chain being connected to the image processing chain in cases where the image transformations are metadata sensitive.

A further object of the invention is to provide an image reproduction system for modifying noise and other metadata during several steps of image processing. The metadata should only be applied on demand. The object is accomplished by a system that comprises:

a) an imaging capture device for providing digital image data;

b) memory device for storing noise and other metadata associated with the digital image data;

c) a first processing chain for carrying out image transformations;

d) a second processing chain for carrying out transformations on a target image; and e) a target image evaluator for determining metadata from the target image in the second processing chain and thereby providing input to a metadata sensitive image transformation in the first processing chain.

No prior art provides the details of metadata propagation in an imaging system, with application to adaptive algorithms. Clearly, the metadata needs to be transformed after each image processing operation, so that it reflects the changes made to the image. Although stochastic process theory provides the background for generating such transformations, the theory has not been applied in a digital imaging system to derive needed input data for image transformations.

BRIEF DESCRIPTION OF THE DRAWINGS

The subject matter of the invention is described with reference to the embodiment shown in the drawings.

DETAILED DESCRIPTION OF THE INVENTION

It facilitates understanding to note that the present invention operates on a digital image. As such, a digital image typically consists of a number of image channels. A common number of image channels is three, one channel for each of the red, green, and blue image channels. A pixel value within the digital image consists of the values at a specific location for each channel of the digital image. Thus the value of a pixel in a digital image may be represented as a function of location. For instance $f_0(x,y)$ refers to a triad of pixel values, for instance {19 34 19} respectively referring to the red, green, and blue values of the pixel located at position (x,y) in the digital image.

Figure 1:
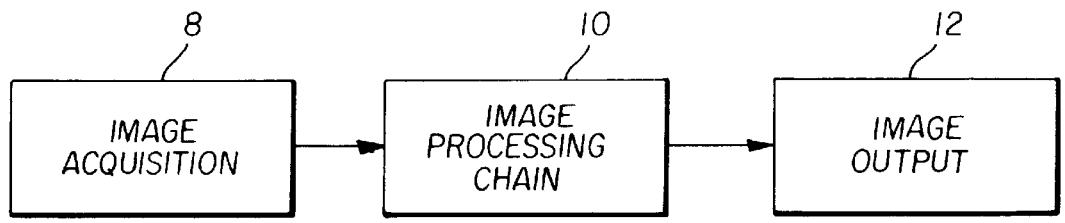
FIG. 1 is a schematic description of an image acquisition and rendering system.
Figure 2:
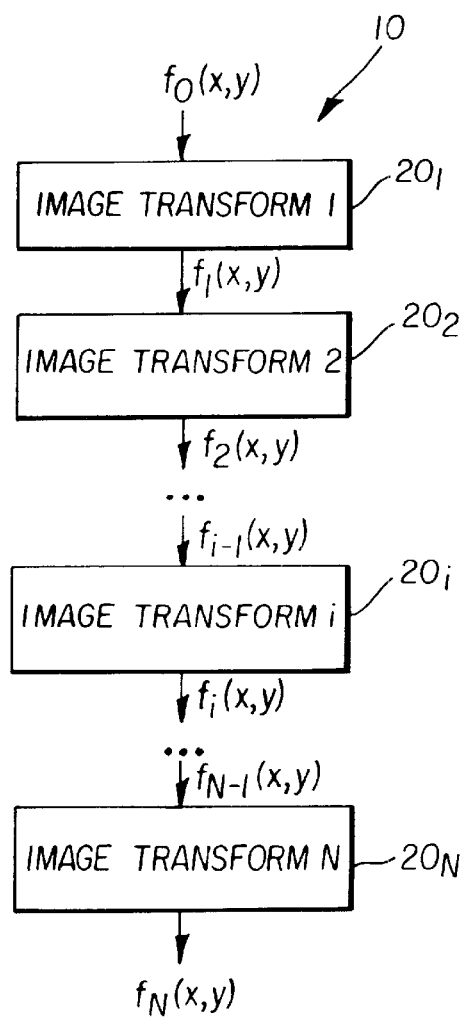
FIG. 2 is a schematic description of an image processing chain.

With reference to FIG. 1, an image acquisition system 8 and an image rendering system 12 are the input and the output side respectively of an image processing chain 10. The image acquisition system 8 can be a film-scanner, a document or print scanner, or a digital camera. The image rendering system 12 may be a conventional display, a digital printer, a photographic printer or a digital copier. The image processing chain 10 comprises a series of image transforms $20_1, 20_2, \ldots, 20_i, \ldots, 20_N$ as shown in FIG. 2. The image transforms $20_1, 20_2, \ldots, 20_i, \ldots, 20_N$ operate on the digital image data, provided by the image acquisition system 8, for producing transformed digital image data. The first image transform $20_1$ is applied to the input digital image data $f_0(x,y)$, generating a first transformed image $f_1(x,y)$. Each remaining image transform i (where $2 \leq i < N$) operates upon the output of the previous image transform $f_{i-1}(x,y)$ in order to generate a transformed image $f_i(x,y)$. The final image transform $20_N$ of the image processing chain 10 produces a final image $f_N(x,y)$.

The image transforms $20_1, 20_2, \ldots, 20_i, \ldots 20_N$ of the image processing chain 10 may comprise simple operations like one-dimensional look-up-tables (1D LUTs), multidimensional look-up-tables (for example a 3-dimensional LUT, as described in U.S. Pat. No. 4,500,919 by William F. Schreiber), matrices that combine the existing channels of the digital image to generate new channels, spatial operations that involve linear convolution of one or more image channels with a linear filter, or other more complicated transforms, like noise reduction and adaptive sharpening.

Data associated with the digital image, which describe attributes of the digital image not described by the pixel values may be useful in the image processing chain 10. The data associated with attributes of a digital image not described by the pixel values of the digital image will herein be referred to as metadata. The set of elements of metadata associated with the digital image $f_i(x,y)$ will herein be referred to as $M_i$. A non-inclusive list of possible elements of metadata may include any of the following: image capture time, shutter speed, image color encoding metric, source of image (digital camera or film camera, for example), focal length of lens, lens aperture, Modulation Transfer Function (MTF) of capture lens, film type, detector type, subject location, subject distance, camera flash information, camera flash fire information, image resolution, focus information and image noise characteristics.

With reference to FIG. 2, it may be beneficial for an image transform to have access to the image metadata. For example, in the case of a transform that sharpens an image, it is advantageous to tailor the level of sharpening by the metadata that describes the MTF of the capture lens. Any $i^{th}$ image transform that may be improved with accurate metadata describing the image $f_{i-1}(x,y)$ input to the $i^{th}$ image transform will herein be referred to as a metadata sensitive image transform. An overall image quality improvement can be made by applying such image transforms with knowledge of the image metadata.

Furthermore, it has also been recognized that the application of certain transforms to a digital image will generate a transformed digital image for which the previously acquired metadata is no longer accurate. Stated another way, if image $f_{i-1}(x,y)$ is transformed by the $i^{th}$ image transform generating image $f_i(x,y)$, the metadata $M_{i-1}$ of the original image is not necessarily equivalent to the metadata of the transformed image $M_i$. In essence, for each $i^{th}$ image transform, there must be found the corresponding $i^{th}$ metadata transform in order to maintain the correspondence between the metadata and the image. For example, consider again the case where the image transform sharpens the digital image. The metadata of the digital image may contain MTF information relating to a blurred image. A transform then applies a sharpening to the digital image, generating a transformed digital image. The metadata (with respect to MTF) of the original digital image is then no longer accurate with respect to the transformed digital image. The advantage of the present invention is to create a metadata transform, related to the image transform that will modify the metadata of the digital image. When the metadata of the digital image is transformed by the metadata transform, the transformed metadata will accurately describe the attributes of the transformed digital image. Any subsequent $i^{th}$ image transform that utilizes metadata will then utilize metadata that is accurate for the digital image $f_{i-1}(x,y)$.

As another example, the input digital image data $f_0(x,y)$ may have associated metadata $M_0$ which notes that the input digital image data $f_0(x,y)$ were captured with a narrow aperture. Suppose the first image transform $20_1$ simulates depth of field, by blurring the non-subject regions of the image, generating image $f_1(x,y)$. The appearance of image $f_1(x,y)$ is that of an image captured with a wide aperture. Thus, the metadata $M_0$ must be transformed by a first metadata transform $30_1$ to create metadata $M_1$, which then contains data associating image $f_1(x,y)$ with a wide aperture. Any subsequent image transforms i (wherein i>1) that make use of the aperture element of the metadata will then recognize that the input digital image data $f_0(x,y)$ have been modified with regard to aperture.

Figure 3:
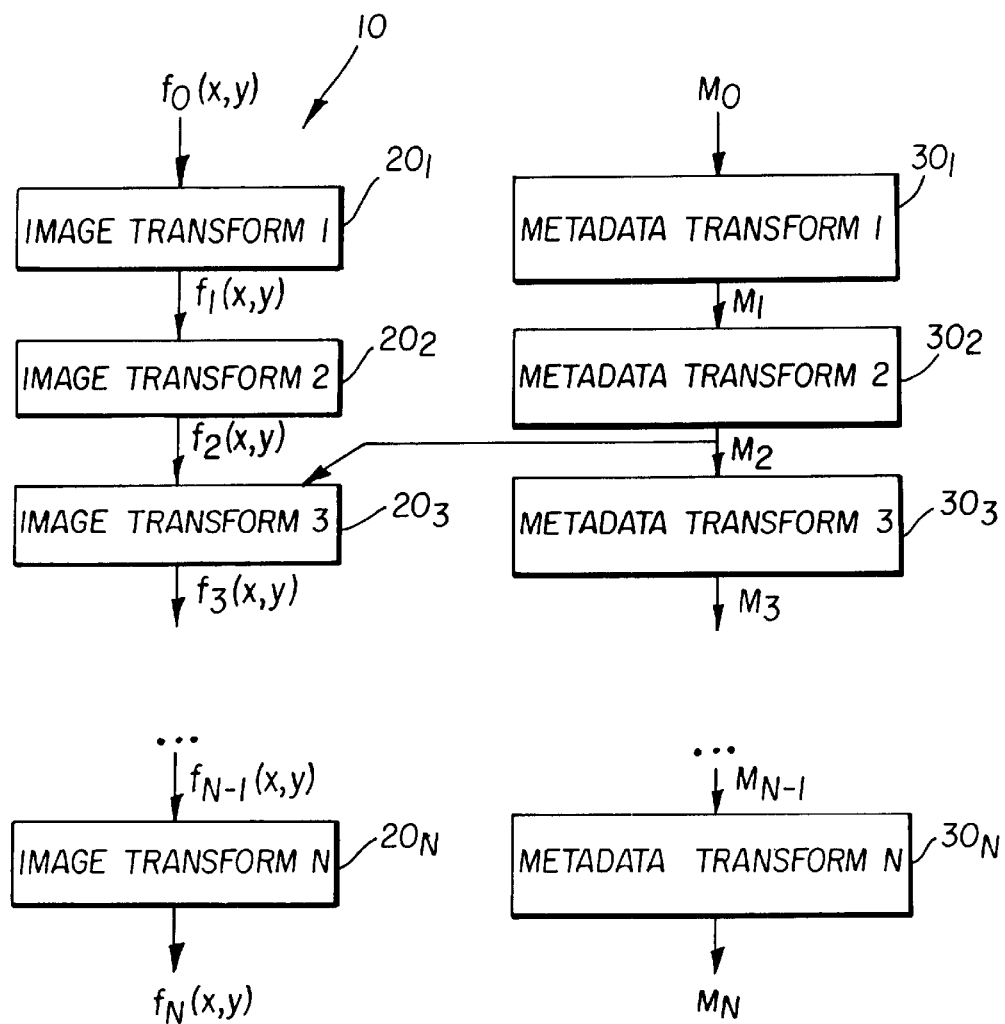
FIG. 3 illustrates an image processing chain wherein one of the image transform utilizes one or more elements of metadata associated with the digital image.

FIG. 3 illustrates an image processing chain 10, of which one of the image transforms $20_1, 20_2, \ldots, 20_N$ (for example the third image transform $20_3$) utilizes one or more elements of metadata associated with the digital image $f_2(x,y)$. The first and second metadata transforms $30_1$ and $30_2$ are generated corresponding to the first and second image transforms $20_1$ and 202. Thus, $M_1$ is generated by applying the first metadata transform $20_1$ to metadata $M_0$. Likewise, $M_2$ is generated by applying the second metadata transform $30_2$ to $M_1$. Metadata $M_2$ describes attributes of the image $f_2(x,y)$ output from the second image transform $20_2$ which are not described by the individual pixels. Thus the third image transform $20_3$, which requires as an input some element of metadata associated with the input digital image, inputs the image $f_2(x,y)$ and the associated metadata $M_2$ which accurately describes the digital image input to the third image transform $20_3$.

Figure 4:
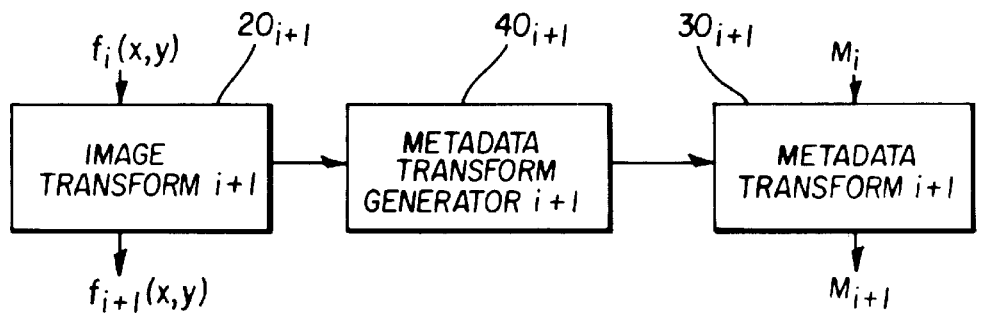
FIG. 4 illustrates the process by which a metadata transform is generated.

FIG. 4 is an illustration of the present invention with regard to the $(i+1)^{th}$ image transform $20_{i+1}$. The specific $(i+1)^{th}$ image transform $20_{i+1}$ is input to the metadata transform generator $40_{i+1}$ for generating a $(i+1)^{th}$ metadata transform corresponding to the $(i+1)^{th}$ image transform. The metadata $M_i$ is then modified by the $(i+1)^{th}$ metadata transform $40_{i+1}$ for producing metadata $M_{i+1}$, which accurately describes the characteristics of image $f_{i+1}(x,y)$. In addition, the $(i+1)^{th}$ image transform $20_{i+1}$ is applied to $f_i(x,y)$ thereby generating $f_{i+1}(x,y)$.

The remainder of the present invention will be described with regard to one specific element of metadata, the image noise characteristics. Although the present invention is described with reference to noise characteristics as the metadata element under consideration, those skilled in the art will recognize that similar metadata transforms may be generated to modify other elements of metadata. The following description describes the operation of the metadata transform generator, which generates for each image transform an appropriate metadata transform for modification of the noise data.

In the embodiment, shown in FIG. 4, the metadata $M_i$ is data describing the noise statistics of the $i^{th}$ image $f_i(x,y)$. These noise statistics are described by a noise table that include the covariance between the noise in related (color) signals. In the following, the symbol, $\sigma_r$ indicates the rms value (standard deviation) for the random variable or process, r. The variance and covariance terms will be written as, e.g., $\sigma_{rr}$, $\sigma_{rg}$. The symbols $\Sigma_i$ and $\Sigma_{i+1}$, will herein indicate the covariance matrices as a function of signal level corresponding to the noise present in the images $f_i(x,y)$ and $f_{i+1}(x,y)$, respectively. For notation convenience we will refer to the image $f_i(x,y)$ as $f_i$ in the following discussion. For three color record (r, g, b) images, the covariance matrices contain the following six quantities: $\sigma_{rr}$, $\sigma_{gg}$, $\sigma_{bb}$, $\sigma_{rg}$, $\sigma_{rb}$, $\sigma_{gb}$ for image data, $f_i$ $$\sum_{i} = \begin{bmatrix} \sigma_{rr} & \sigma_{rg} & \sigma_{rb} \\ \sigma_{rg} & \sigma_{gg} & \sigma_{gb} \\ \sigma_{rb} & \sigma_{gb} & \sigma_{bb} \end{bmatrix}.$$

For each such image transform $20_{i+1}$, the corresponding transformation of the image noise statistics, representing the $i^{th}$ metadata transform $30_{i+1}$, is determined.

Matrix

With regard to FIG. 4, if the image transform $20_{i+1}$ is a linear matrix A, then $$f_{i+1} = A f_i, \qquad \text{Eq. (2)}$$

then the corresponding (metadata) noise covariance transformation is $$\Sigma_{i+1} = A \Sigma_i A^T, \qquad \text{Eq. (3)}$$

where the superscript $^T$ indicates the transpose.

One-Dimensional Continuous Transformation

With regard to FIG. 4, if the image transform $20_{i+1}$ is a one-dimensional function. It is defined by a continuous function $g_i$ for each image channel. If it is denoted as G and operates as $$f_{i+1} = G f_i \qquad \text{Eq. (4)}$$

and G can be expanded, for a three-color system, so Equation (4) becomes $$\begin{bmatrix} s \\ t \\ u \end{bmatrix} = \begin{bmatrix} g_1(p) \\ g_2(q) \\ g_3(r) \end{bmatrix},$$  Eq. (5)

where the sets of input and output signals are {p, q, r} and {s, t, u}, respectively. The corresponding covariance matrix transform is described in the article by Peter D. Burns and Roy S. Berns, "Error Propagation Analysis in Color Measurement and Imaging."

$$\Sigma_{i+1} = J_G \Sigma_{i+1} J_G^T$$  Eq. (6)

where $$J_G = \begin{bmatrix} \frac{\partial g_1}{\partial p} & 0 & 0 \\ 0 & \frac{\partial g_2}{\partial q} & 0 \\ 0 & 0 & \frac{\partial g_3}{\partial r} \end{bmatrix}_{\mu_G}$$

where $J_G$ is evaluated at the average input signal level, $\mu_G$.

One-Dimensional Look-up Table

With regard to FIG. 4, if the image transform $20_{i+1}$ is a one-dimensional LUT, it can be seen as a discrete form of the above one-dimensional function. If so, the partial derivative elements of $J_G$ can be approximated by $$\frac{\partial g_1}{\partial p} = LUT_1[p] - LUT_1[p-1]$$  Eq. (7)

or $$\frac{\partial g_1}{\partial p} = \frac{LUT_1[p+1] - LUT_1[p-1]}{2},$$  Eq. (8)

or other similar digital filter, where the discrete signals take on integer values, {0, 1, 2, . . . }.

Figure 5:
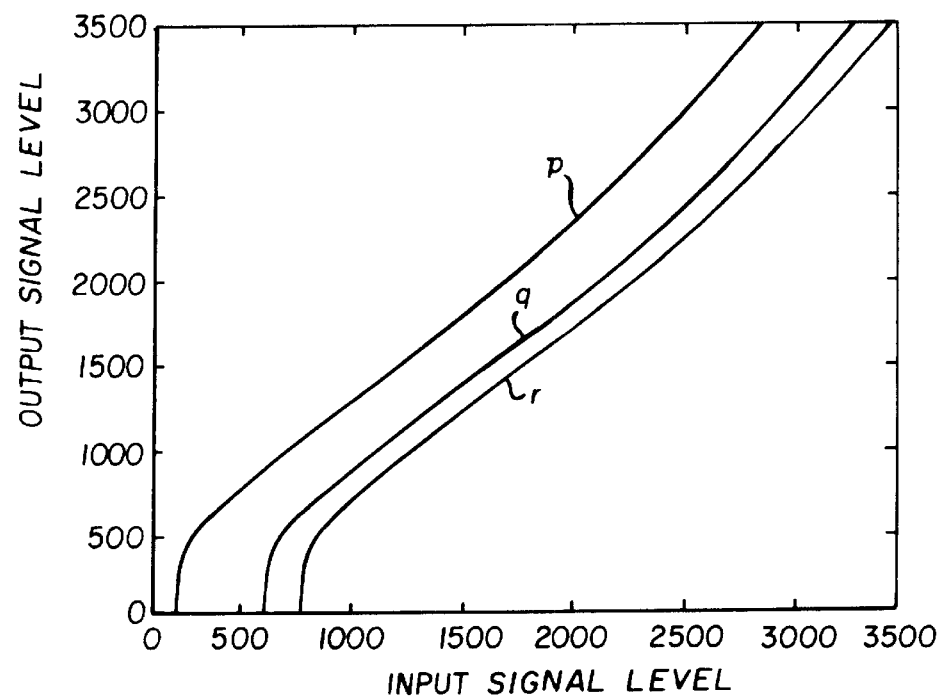
FIG. 5 is a typical sensitometry correction look-up table.
Figure 6:
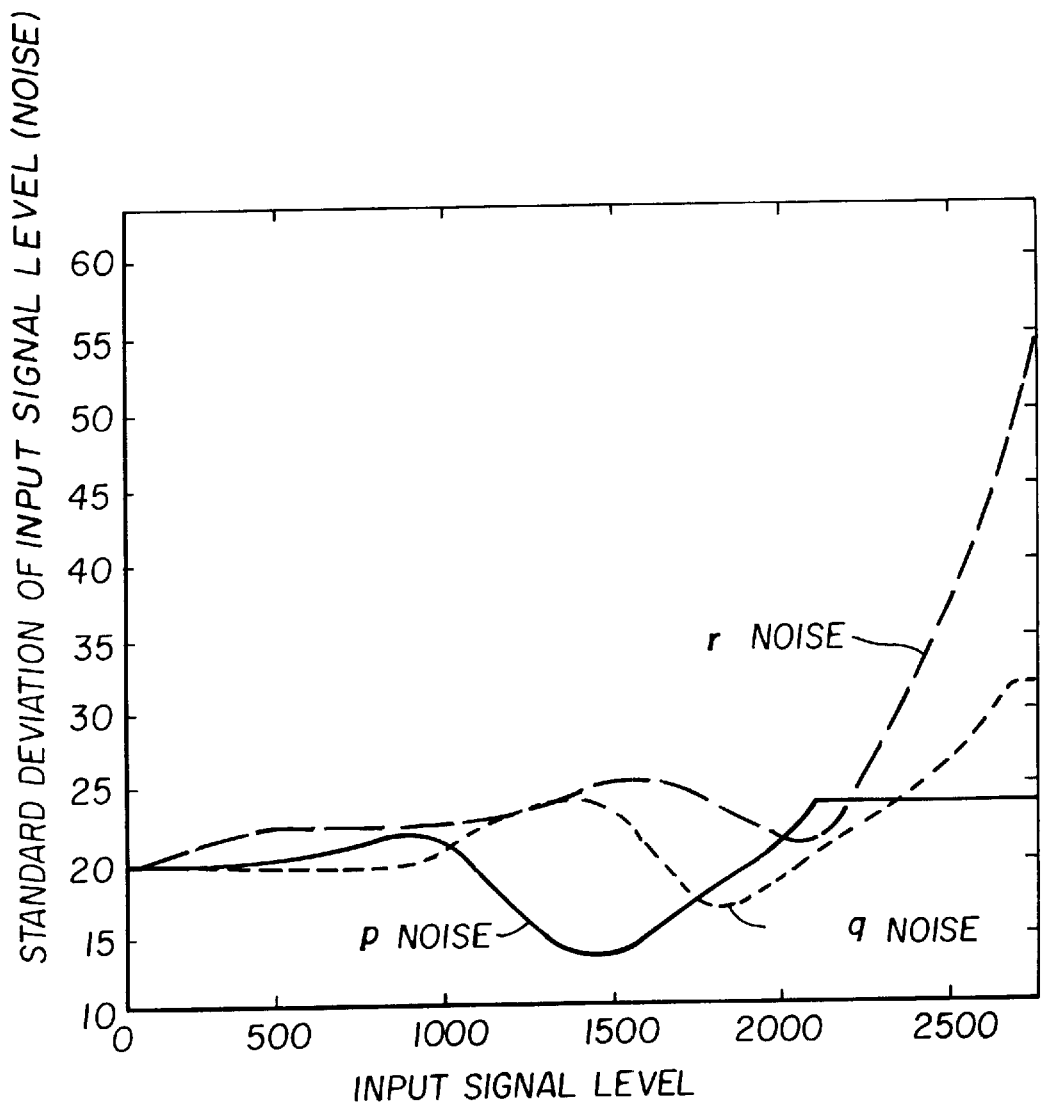
FIG. 6 is a typical signal dependent noise table for a scanned film, wherein the noise level is shown for the colors red, green and blue.
Figure 7:
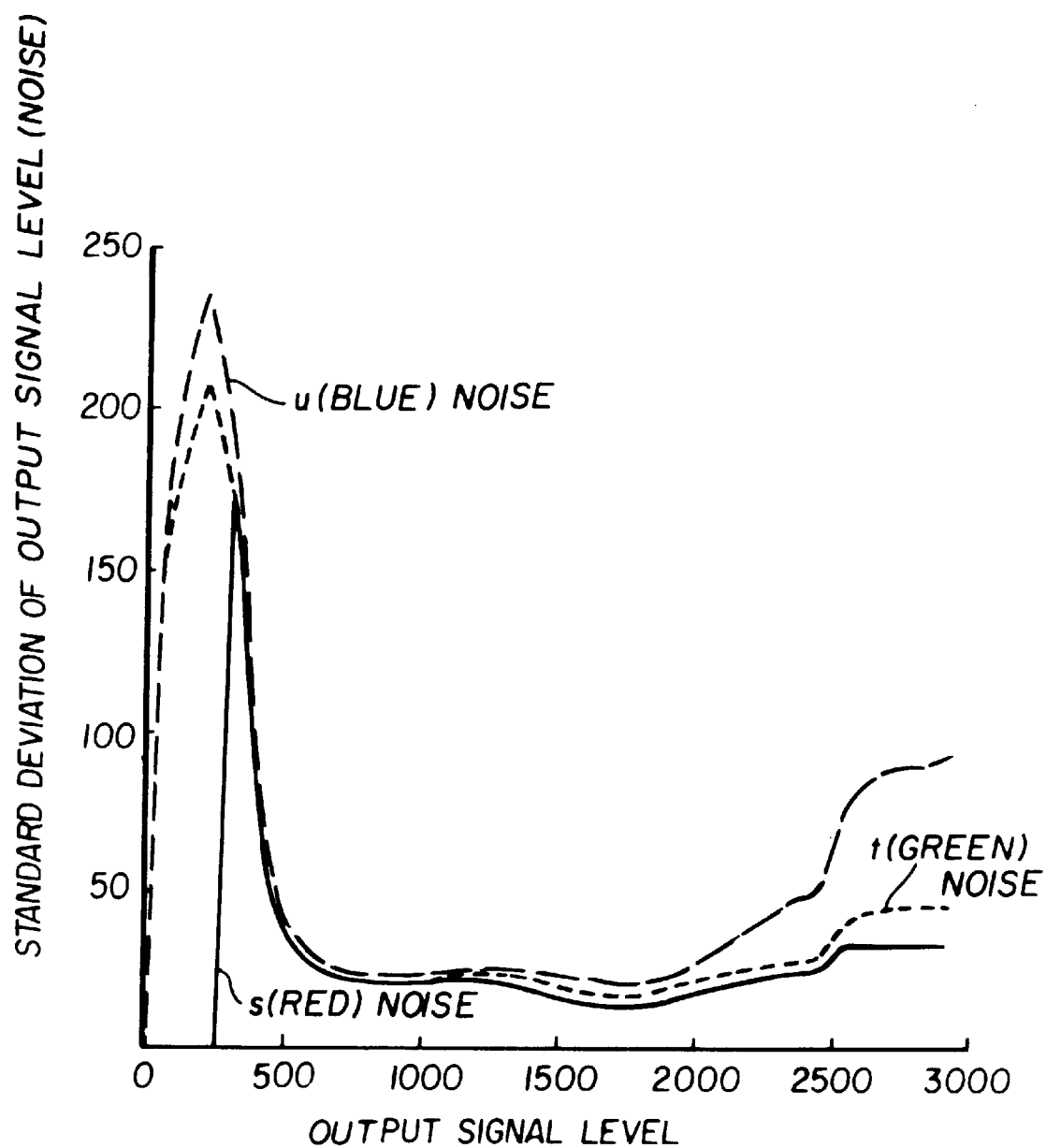
FIG. 7 is a modified noise table to compensate for sensitometry correction look-up table, wherein the standard deviation of the noise is shown for the colors red, green and blue.

FIG. 5 is a typical film sensitometry correction LUT. It shows the relation between the input signal level and the output signal level which can be regarded as a tone scale transformation. The output signal level is not a linear function of the input signal level. An example for the original signal dependent noise table for a scanned film is shown in FIG. 6. Using the sensitometry correction LUT shown in FIG. 5 as the image transform under consideration, the metadata transform for noise characteristics is represented by equation 8. Application of this metadata transform to the original noise data yields the noise table in FIG. 7. The table in FIG. 7 is a modified noise table to compensate for the sensitometry correction LUT, wherein the standard deviation of the noise is shown for the colors red, green and blue. This modified noise table (FIG. 7) is appropriate to input to algorithms applied to the image after the sensitometry correction LUT. It can be noticed that FIG. 7 shows extremely high noise at low input signal levels. This is a direct result of the noise amplification resulting from the high slope at low input signal levels in FIG. 5.

Multi-dimensional Continuous Transformation

With regard to FIG. 4, if the image transform $20_{i+1}$ is a three-dimensional function, it is defined by a continuous function for each image record. If it is denoted as G, and operates as $$f_{i+} = G f_i$$  Eq. (9)

where $$\begin{bmatrix} s \\ t \\ u \end{bmatrix} = \begin{bmatrix} g_1(p, q, r) \\ g_2(p, q, r) \\ g_3(p, q, r) \end{bmatrix},$$

where the sets of input and output signals are {p, q, r} and {s, t, u}, respectively. The corresponding covariance matrix transform is described in the article by Peter D. Burns and Roy S. Berns, in Color Research and Application, 22:280–289 1997.

$$\Sigma_{i+1} = J_G \Sigma_{i+1} J_G^T$$  Eq. (10)

where $$J_G = \begin{bmatrix} \frac{\partial g_1}{\partial p} & \frac{\partial g_1}{\partial q} & \frac{\partial g_1}{\partial r} \\ \frac{\partial g_2}{\partial p} & \frac{\partial g_2}{\partial q} & \frac{\partial g_2}{\partial r} \\ \frac{\partial g_3}{\partial p} & \frac{\partial g_3}{\partial q} & \frac{\partial g_3}{\partial r} \end{bmatrix}_{\mu_G}$$

and $J_G$ is evaluated at the average input signal level, $\mu_G$.

Multi-Dimensional Look-up Table

With regard to FIG. 4, if the image transform $20_{i+1}$ is a multi-dimensional LUT, it can be seen as a discrete form of the above continuous function. If so, the partial derivative elements of $J_G$ can be approximated by discrete differences, e.g., $$\frac{\partial g_1}{\partial p} = LUT_1[p, q, r] - LUT_1[p-1, q, r]$$  Eq. (11a)

or $$\frac{\partial g_1}{\partial p} = \frac{LUT_1[p+1, q, r] - LUT_1[p-1, q, r]}{2},$$  Eq. (11b)

or other similar digital filter.

The noise propagation can be accomplished by estimating the six unique elements of the matrix. Thus, the element of metadata $M_{i+1}$ regarding the image noise statistics may be determined.

Spatial Filter

Digital filtering either by a fixed-coefficient kernel or by a locally adaptive kernel is usually accomplished by a discrete convolution. For a general (n×m) filter with coefficients $h_{k,l}$, wherein k=1,2, . . . n and l=1,2, . . . m, the variance transformation is $$\sigma_{ss} = \left[ \sum_{k=1}^{n} \sum_{l=1}^{m} h_{k,l}^2 \right] \sigma_{pp},$$  Eq. (12)

if the p color-record is filtered. Note that the filter operation, becomes an identity operation for color records where no spatial filtering is performed. The above equations can be expanded to include pixel-to-pixel and record-to-record covariance if needed.

Localized Metadata Maps

Some image transforms behave in such a way that their properties are adapted based on the characteristics in localized regions of the image. In this regard, these algorithms are referred to as adaptive algorithms. This results in varying of the metadata, dependent upon the original pixel value within any given region. As an example, an adaptive noise reduction algorithm could consist of a kernel sliding across the image and aggressively blurring regions where it senses that the region does not contain textures or edges, while conservatively removing noise in regions where there are textures or edges present. Similarly an adaptive sharpening algorithm may boost the high frequencies in busy or edge regions of the image while avoiding the boost in the uniform backgrounds to avoid amplification of the noise.

Figure 8:
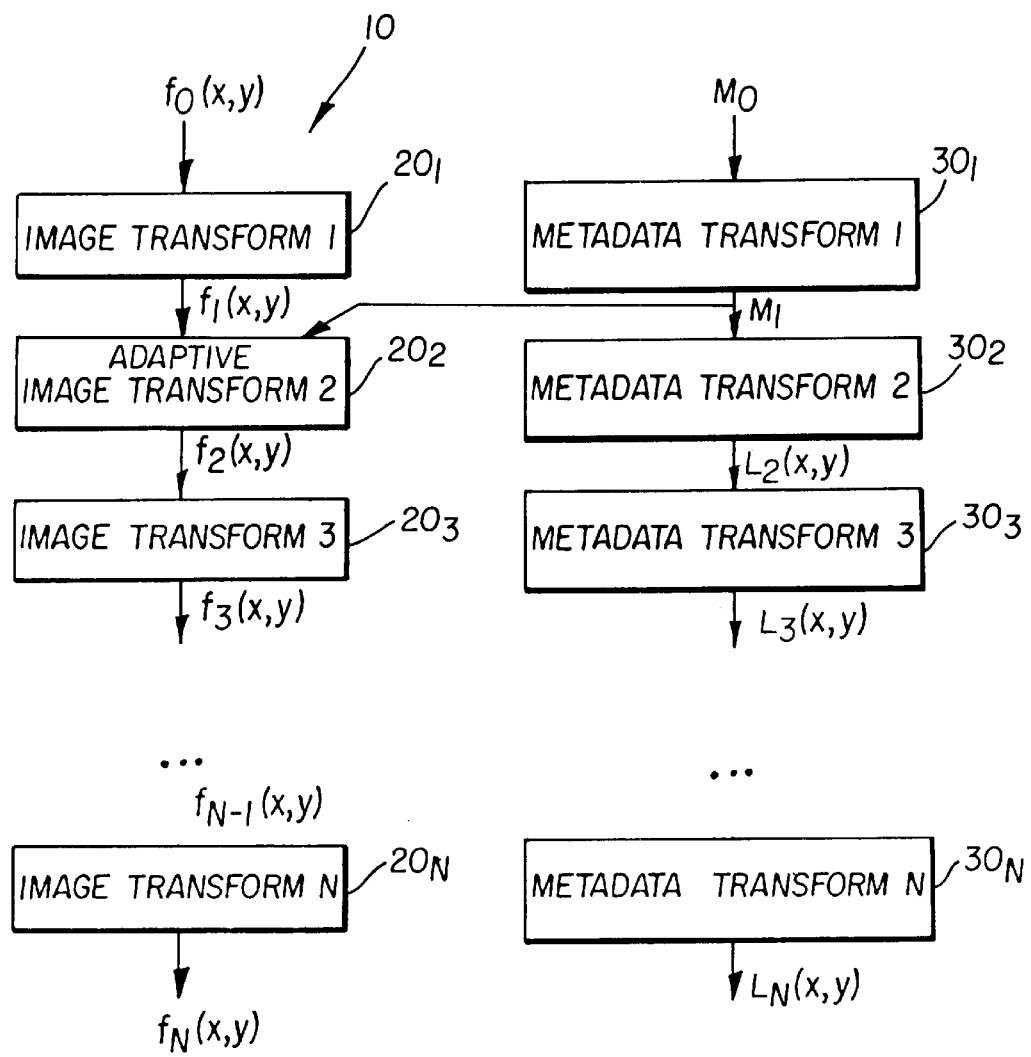
FIG. 8 is a schematic description of the propagation of localized maps for adaptive algorithms.

The metadata corresponding to images that have been processed using adaptive algorithms will be affected in the localized regions, rather than on a global basis. That is, different regions of the image will exhibit different noise statistics after an adaptive noise reduction algorithm has been applied. Also, different regions of the image will exhibit different effective sharpness after an adaptive sharpening algorithm has been applied. Another example of localized operations is lens falloff compensation. Lens falloff in the image capture device causes the image to exhibit different sharpness and exposure characteristics from the center of the image towards the corners. The lens light falloff could be compensated using an image masking transform, but the noise characteristics after application of the masking transform will be location dependent. FIG. 8 presents a schematic diagram with the preferred method to deal with the propagation of localized metadata in the present embodiment. Referring to FIG. 8, a first image transform $20_1$ is applied to the original image $f_0$. A second image transform $20_2$ is then applied. This transform is adaptive or localized as defined above. The metadata $M_0$ corresponding to the original image is first transformed by a global metadata transformation producing metadata $M_1$. Due to the adaptive nature of the second image transform $20_2$ a two dimensional map, $L_2(x,y)$, is created by a localized metadata transform $30_2$. This map carries the local metadata information of the image on a pixel by pixel basis. In this regard the maps, $L_i(x,y)$, are generally referred to as localized metadata maps, or localized noise data maps in the case where the element of metadata is image noise. The localized map is transformed after each metadata transformation $30_2, 30_3, \ldots, 30_N$ corresponding to image transforms $20_2, 20_3, \ldots, 20_N$. Noise transforms such as the ones described before (LUT's, Matrices, spatial filters, etc.) are applied to the localized metadata maps. The next example provides a detailed description of this method as it relates to the application of an adaptive noise reduction algorithm to a digital image.

A popular adaptive noise reduction algorithm is considered here: Lee's sigma filter (see, Lee, J. *Digital Image Smoothing and the Sigma Filter*. Computer Vision, Graphics, and Image Processing 24, 255–269, 1983). It is not the purpose of the authors to make claims on this particular algorithm, but to use it for demonstration purposes. The sigma filter consists of a rectangular sampling window that is convolved with the digital image. A sliding window is moved across the image, and at every center pixel position the image noise is smoothed by averaging only those neighborhood pixels that have intensities within a fixed range from the center pixel intensity. Consequently, image edges are preserved and subtle details are retained.

It is assumed that the expected noise as a function of signal level is provided in the form of a noise table as the one described in U.S. Pat. No. 5,641,596, $$\sigma = N[f(x,y)]$$

where $\sigma$ is the noise standard deviation, and N is the noise table.

FIG. 6 presents an example of the noise table for scanned negative film. The sigma filter will select those pixels in the local window that fall inside some pre-defined number of intensity standard deviations from the center pixel intensity. The center pixel is then replaced by the average of the selected pixels. That is, if $f_i(k,l)$ identifies the pixels in a rectangular window of size m×n, at row k, column l in the digital image $f_i$, and $f_{i+1}(x,y)$ is the center pixel value at row x, column y, in the digital image $f_{i+1}$ we can express the local filter transform of size m×n by the following equations: Let $$\delta_{k,l} = 1, \quad \text{if } [f_i(x,y) - \Delta] \le f_i(k,l) \le [f_i(x,y) + \Delta] \qquad \text{Eq. (13)}$$
$$= 0, \quad \text{otherwise}$$

where $\Delta$ is an intensity range based on the expected noise standard deviation given by the noise table (e.g. $\Delta = 2\sigma$). Then, $$f_{i+1}(x,y) = \frac{\sum_{k=x-n}^{n+x} \sum_{l=y-m}^{m+y} \delta_{k,l} f_i(k,l)}{\sum_{k=x-n}^{n+x} \sum_{l=y-m}^{m+y} \delta_{k,l}} \qquad \text{Eq. (14)}$$

After applying the adaptive noise reduction algorithm to the image, the previously acquired metadata elements corresponding to noise characteristics, provided in the noise table, are no longer valid. Therefore, a metadata transform needs to be determined to modify the noise elements in the metadata. Let $\sigma_{pp}(d)$ denote the noise variance as a function of signal level d corresponding to image $f_i$ in Equation 14; and let $\sigma_{ss}(x,y,d)$ denote the noise variance as a function of position (x,y) and signal level d corresponding to image $f_{i+1}$ in Equation 14 after applying an n×m sigma filter; due to the adaptive nature of the filter the new variance $\sigma_{ss}$ will be also a function of position, and is given by $$\sigma_{ss}(x,y,d) = \alpha(x,y) \cdot \sigma_{pp}(d) \qquad \text{Eq. (15)}$$

where the location dependent coefficient $\alpha$ is derived from Equation 12, and is given by $$\alpha(x,y) = \sum_{k=1}^{n} \sum_{l=1}^{m} h_{k,l}^2 \qquad \text{Eq. (16)}$$

where $$h_{k,l} = \frac{\delta_{k,l}}{\sum_{k=1}^{n} \sum_{l=1}^{m} \delta_{k,l}} \qquad \text{Eq. (17)}$$

and $\delta$ is given by equation 13.

Then, the noise at every image plane could be propagated via the two dimensional function, $\alpha(x,y)$, where each location (x,y) corresponds to a location (x,y) in the digital image $f_{i+1}(x,y)$. In essence, $\alpha(x,y)$ along with the original noise variance statistics $\sigma_{pp}(d)$, become the localized metadata or noise data map $L(x,y)$. The entries at every (x,y) location in $L(x,y)$ when multiplied by the original noise variance statistics $\sigma_{pp}(d)$, correspond to the new noise variance statistics as a function of signal level, in the form of a noise table. Also, the map $L(x,y)$ could be decimated or compressed to a manageable size in order to avoid demanding memory storage and to improve system's throughput. Subsequent noise sensitive transformations will read the map, interpolate or decompress it and calculate the expected noise at every image location (x,y). The method could be easily extended to provide any metadata information such as Noise Power Spectrum, covariance, MTF, etc. on a localized basis.

Alternative Embodiment Using Generated Targets

Figure 9:
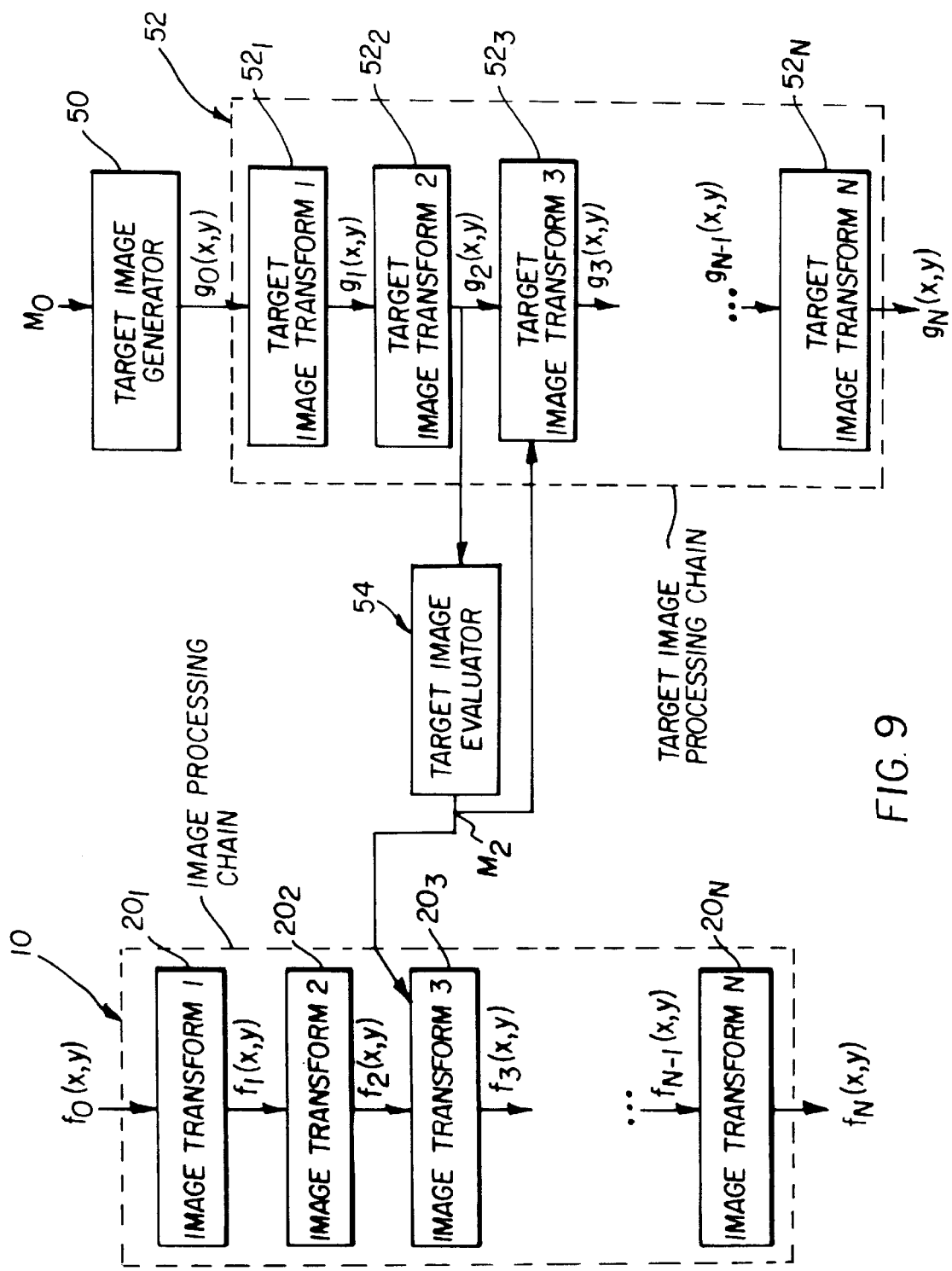
FIG. 9 illustrates a further embodiment of the present invention wherein the image processing chain makes use of evaluated target image transformations.

FIG. 9 illustrates an alternative embodiment of the present invention in which a target image $g_0(x,y)$ is generated exhibiting the characteristics of the metadata $M_0$. In this regard, the metadata $M_0$ is input to the target image generator 50. In the preferred embodiment, the metadata $M_0$ includes noise data. This noise data is density dependent and may be described in a noise table. Such a table consists of a list of mean intensities and corresponding covariances. Table 1 presents an example of such table with noise standard deviation as a function of mean intensity.

TABLE 1

Noise Table

| Mean Intensity | Channel Variance |
|---|---|
| 500 | 20 |
| 505 | 22 |
| 510 | 25 |
| 515 | 23 |

The target image generator 50 then generates a target image $g_0(x,y)$ with the noise characteristics described by $M_0$. In the preferred embodiment, the target image $g_0(x,y)$ is an image consisting of several patches that span the signal range, each of which has dimensions A pixels by B lines and statistics similar to those of the actual image. Each patch of A×B pixels is generated by randomly assigning each of the pixel values a value x, where x is a random variable with probability distribution as in the equation (18):

$$f_x(x) = \frac{e^{\frac{-0.5(x-\mu)^2}{\sigma^2}}}{\sigma\sqrt{2\pi}} \quad \text{Eq. (18)}$$

The value of $\mu$ for a given patch n of the target image $g_0(x,y)$ may be selected as the $\mu$ value for row n of the noise table in Table 1. For example, for the first line of the target image $g_0(x,y)$, $\mu=500$, and $\sigma=20$.

Again referring to FIG. 9, there is illustrated an image processing chain 10 for the image $f_0(x,y)$ and a corresponding target image processing chain 52 for the target image g(x,y). In the preferred embodiment, each image transform $52_1, 52_2, \ldots, 52_N$ of the target image processing chain 52 is identical to the image transform $20_1, 20_2, \ldots, 20_N$ in the image processing chain 10. The first and second image transform $20_1$ and $20_2$ are then applied successively to the image $f_0(x,y)$. The third image transform $20_3$ is a metadata sensitive image transform. The required inputs for the third image transform $20_3$ are the image $f_2(x,y)$ and the metadata $M_2$. The metadata $M_2$ is determined by applying the first two image transforms $52_1$ and $52_2$ of the target image processing chain 52 to the target image $g_0(x,y)$. The target image $g_2(x,y)$ output from the second target image transform $52_2$ is then passed to a target image evaluator 54 for generating metadata $M_2$. The target image evaluator 54 computes the mean $\mu$ and covariance elements of each line in the target image $g_2(x,y)$, thereby generating the required information for noise table of metadata $M_2$. The metadata $M_2$ may then be passed to the third image transform $20_3$ along with the image $f_2(x,y)$ for generating the image $f_3(x,y)$. Those skilled in the art will recognize that this process may be continued for any length of image processing chain.

The invention has been described in detail with particular reference to certain preferred embodiments thereof, but it will be understood that variations and modifications can be effected within the spirit and scope of the invention.

Parts List 8 image acquisition system
10 image processing chain
12 image rendering system
$20_1, 20_2, \ldots, 20_i, \ldots, 20_N$ image transforms
$30_1, 30_2, \ldots, 30_N$ metadata transform
$40_{i+1}$ metadata transform generator i+1
50 target image generator
52 target image processing chain
$52_1, 52_2, 52_3, \ldots, 52_N$ target image transforms
54 target image evaluator
$f_0(x,y)$ input digital image data
$f_1(x,y)$ first transformed image
$f_N(x,y)$ final image
$M_i$ set of elements of metadata i
$f_{i-1}(x,y)$ input to the image transform i
$L_i(x,y)$ localized metadata map i
$g_0(x,y)$ target image

What is claimed is:

1. A method for modification of metadata in an image processing chain that includes the step of performing an image transformation that modifies a characteristic of a digital image to produce a transformed digital image, comprising the steps of:
   a) providing metadata corresponding to the characteristic of the digital image;
   b) generating a metadata transformation related to the image transformation that modifies the metadata so that it accurately describes the modified characteristic of the transformed digital image;
   c) applying the metadata transformation to the metadata to produce transformed metadata;
   d) associating the transformed metadata with the transformed digital image;
   e) providing a metadata sensitive image transformation; and
   f) using the metadata sensitive image transformation and the transformed metadata to modify the transformed digital image to produce a further transformed digital image.

2. The method as claimed in claim 1, wherein the metadata comprises one or more of the following: system Modulation Transfer Function (MTF), system spectral responsitivities, capture device aperture, system effective aperture, depth of field, or localized metadata maps.

3. The method as claimed in claim 1, wherein the metadata transformation comprises one or more of the following: univariate transformations, multidimensional transformations, matrices, one-dimensional look-up-tables, multidimensional look-up-tables, linear spatial filtering operations, adaptive filtering operations or masking operations.

4. The method claimed in claim 1, further comprising the steps of:
   g) generating a second metadata transformation related to the metadata sensitive image transformation that modifies the transformed metadata so that it accurately describes a modified characteristic of the further transformed digital image;
   h) applying the second metadata transformation to the transformed metadata to produce further transformed metadata; and i) associating the further transformed metadata with the further transformed digital image.

5. A method for modification of noise metadata in an image processing chain that includes the step of performing an image transformation that modifies the noise characteristics of a digital image to produce a transformed digital image, comprising the steps of:
   a) providing noise metadata corresponding to the noise characteristics of the digital image;
   b) generating a noise metadata transformation related to the image transformation that modifies the noise metadata so that it accurately represents the modified noise characteristics of the transformed digital image;
   c) applying the noise metadata transformation to the noise metadata to produce transformed noise metadata; and
   d) associating the transformed noise metadata with the transformed digital image.

6. The method as claimed in claim 5, wherein the noise data comprises one or more of the following: signal dependent covariance statistics, signal independent covariance statistics, noise power spectrum, or localized noise data maps.

7. The method as claimed in claim 5, wherein the specific image transformation comprises one or more of the following: univariate transformations, multidimensional transformations, matrices, one-dimensional look-up-tables, multidimensional look-up-tables, linear spatial filtering operations, adaptive filtering operations or masking operations.

8. A method for modification of metadata that describes a characteristic of a digital image in an image processing chain, comprising the steps of:
   a) providing metadata corresponding to the characteristic of the digital image;
   b) generating a target image having the characteristic described by the provided metadata;
   c) providing an image transform that modifies the characteristic of the digital image to produce a transformed digital image having a modified characteristic;
   d) processing the target image through the image transform to produce a processed target image having a modified characteristic; and
   e) calculating modified metadata from the processed target image so that it accurately represents the modified characteristics of the transformed digital image.

9. The method as claimed in claim 8, wherein the metadata comprises of one or more of the following: system Modulation Transfer Function (MTF), system spectral responsivities, capture device aperture, system effective aperture, depth of field, or localized metadata maps.

10. The method as claimed in claim 8, wherein the metadata transformation comprises one or more of the following: univariate transformations, multidimensional transformations, matrices, one-dimensional look-up-tables, multidimensional look-up-tables, linear spatial filtering operations, adaptive filtering operations or masking operations.

11. A method for modification of noise metadata that describes the noise characteristics of a digital image in an image processing chain, comprising the steps of:
   a) providing noise metadata corresponding to the noise characteristics of the digital image;
   b) generating a target image having the noise characteristic described by the provided noise metadata;
   c) providing an image transform that modifies the noise characteristics of the digital image to produce a transformed digital image having modified noise characteristics;
   d) processing the target image through the image transform to produce a processed target image having modified noise characteristics; and
   e) calculating modified noise metadata from the processed target image so that it accurately represents the modified noise characteristics of the transformed digital image.

12. The method as claimed in claim 11, wherein the noise metadata comprises one or more of the following: signal dependent covariance statistics, signal independent covariance statistics, noise power spectrum, or localized noise data maps.

13. The method as claimed in claim 11, wherein the specific image transformation comprises one or more of the following: univariate transformations, multidimensional transformations, matrices, one-dimensional look-up-tables, multidimensional look-up-tables, linear spatial filtering operations, adaptive filtering operations or masking operations.

14. An image reproduction system comprising:
   a) an imaging capture device for providing digital image data;
   b) a memory device for storing noise metadata and other metadata that describe noise characteristics and other attributes of the digital image data;
   c) an image processing chain for carrying out image transformations on the digital image data that modify the noise characteristics and other attributes of the digital image data; and
   d) a metadata processing chain being connected to the image processing chain for carrying out metadata transformations that modify the noise metadata and other metadata so that it accurately describes the modified noise characteristics and other attributes of the transformed digital image.

15. The system as described in claim 14, wherein the noise metadata and other metadata comprises one or more of the following: signal dependent covariance statistics, signal independent covariance statistics, noise power spectrum, localized metadata maps, system Modulation Transfer Function (MTF), system spectral responsivities, capture device aperture, system effective aperture or depth of field.

16. The system as described in claim 14, wherein the image processing chain comprises one or more of the following image processing operations: univariate transformations, multidimensional transformations, matrices, one-dimensional look-up-tables, multidimensional look-up-tables, linear spatial filtering operations, adaptive filtering operations or masking operations.

17. The system as described in claim 14, wherein the metadata processing chain has at least one metadata transformation related to the image transformation.

18. The system as described in claim 14, wherein the metadata processing chain has at least one noise data transformation related to the image transformation.

19. An image reproduction system comprising:
   a) an imaging capture device for providing digital image data;
   b) a memory device for storing noise metadata and other metadata that describe noise characteristics and other attributes of the digital image data;
   c) a first processing chain responsive to modified noise metadata and modified other metadata for carrying out image transformations on the digital image data that modify the noise characteristics and other attributes of the digital image data;

d) a second processing chain for carrying out the image transformations on a target image having noise characteristics and other attributes similar to the digital image to produce a modified target image; and e) a target image evaluator for determining modified noise metadata and modified other metadata from the modified target image and providing the modified noise metadata and modified other meta data to the first processing chain.

20. The system as described in claim 19, wherein the noise and other metadata comprises one or more of the following: signal dependent covariance statistics, signal independent covariance statistics, noise power spectrum, localized metadata maps, system Modulation Transfer Function (MTF), system spectral responsitivities, capture device aperture, system effective aperture or depth of field.

21. The system as described in claim 19, wherein the first and second image processing comprises one or more of the following image processing operations: univariate transformations, multidimensional transformations, matrices, one-dimensional look-up-tables, multidimensional look-up-tables, linear spatial filtering operations, adaptive filtering operations or masking operations.

* * * * *